United States Patent [19]

Leighty

[11] Patent Number: 4,723,096
[45] Date of Patent: Feb. 2, 1988

[54] ARC LAMP POWER SUPPLY USING A VOLTAGE MULTIPLIER

[75] Inventor: Bradley D. Leighty, Newport News, Va.

[73] Assignee: The United States of America as represented by the Administrator of the National Aeronautics and Space Administration, Washington, D.C.

[21] Appl. No.: 879,758

[22] Filed: Jun. 27, 1986

[51] Int. Cl.⁴ .................. H02M 1/14; H05B 37/00
[52] U.S. Cl. .................... 315/254; 315/276; 315/277; 315/255; 315/200 R; 315/227 R; 315/241 R; 315/245; 363/59; 363/61
[58] Field of Search .............. 315/205, 207, 254, 255, 315/257, 276, 277, DIG. 5, DIG. 7, 200 R, 206, 227 R, 241 R, 245; 363/59, 61

[56] References Cited

U.S. PATENT DOCUMENTS

| | | | |
|---|---|---|---|
| 2,926,287 | 2/1960 | Bird | 315/205 |
| 3,665,247 | 5/1972 | Gordon | 315/205 |
| 3,849,717 | 11/1974 | Walz et al. | 363/61 |
| 3,917,975 | 11/1975 | Birkner | 315/205 |
| 4,187,449 | 2/1980 | Knoble | 315/205 |
| 4,260,932 | 4/1981 | Johnson | 315/205 |
| 4,445,166 | 4/1984 | Berglund et al. | 363/61 |

*Primary Examiner*—David K. Moore
*Assistant Examiner*—Michael J. Nickerson
*Attorney, Agent, or Firm*—George F. Helfrich; Harold W. Adams; John R. Manning

[57] ABSTRACT

A power supply is provided for an arc discharge lamp (38) which includes a relatively low voltage high current power supply section and a high voltage starter circuit (10). The low voltage section includes a transformer (15), rectifier (24), variable resistor (26) and a bank of capacitors (28), while the starter circuit (10) comprises a plurality of diodes (D1 to D12) and capacitors (C1 to C12) connected as a Cockcroft-Walton multiplier. The starting circuit is effectively bypassed when the lamp arc is established and serves to automatically provide a high starting voltage to re-strike the lamp arc if the arc is extinguished by a power interruption.

5 Claims, 3 Drawing Figures

ARC LAMP POWER SUPPLY USING A VOLTAGE MULTIPLIER

ORIGIN OF THE INVENTION

The invention described herein was made by an employee of the U.S. Government and may be manufactured and used by or for the Government for governmental purposes without the payment of any royalties thereon or therefor.

FIELD OF THE INVENTION

The present invention relates to power supplies for relatively large, e.g., 25 watt, arc discharge lamps.

BACKGROUND OF THE INVENTION

Large (2-watt and up concentrated arc lamps find widespread application in scientific fields and elsewhere including use as light sources for Schlieren, shadowgraph and other flow visualization techniques. A serious drawback in the operation of such lamps is the intermittent or otherwise unreliable performance of the associated power supplies. Such lamps make very substantial demands on their power supplies in that a starting voltage of in excess of 1000 volts is required whereas, when the arc is stabilized, the voltage drop across the lamp is approximately 20 volts. Conventional operating techniques involve supplying the lamp from a constant voltage in excess of 50 volts, with a series resistance being used to limit the current to about 1.25 amperes. This series resistance also serves to eliminate the effect of the negative resistance of the lamp arc. The starting voltage for the lamp is conventionally provided by a relay-choke combination which produces a high voltage spike by inductive kickback. This technique for generation of the starting voltage is the weakest feature of such conventional power supplies.

There are, of course, many different designs for power supplies for many different applications. Patents of interest in this general field include U.S. Pat. Nos. 3,544,840 (Saiger); 3,629,647 (Lake); 3,665,247 (Gordon); and 3,849,717 (Walz et al). The Walz et al patent discloses a circuit for gas discharge lamps wherein both supply and firing voltages are provided by a voltage multiplier comprising a plurality of voltage doubler circuits. The Saiger patent discloses a supply circuit for a gas discharge lamp such as a xenon tube which employs a transformerless multiplier of the capacitor-rectifier type in combination with a pulse trigger circuit. The Lake patent discloses a voltage doubling starting circuit for a gas discharge lamp comprising a pair of diodes and a pair of capacitors connected in a voltage doubling configuration in combination with a bleeder resistor. The Gordon patent discloses a power regulating circuit for light amplifier tubes which includes a voltage multiplier formed by capacitors and diodes.

Other patents of more general interest include U.S. Pat. Nos. 3,911,191 (Patrick et l); 4,241,360 (Hambor et al); and 4,389,703 (Morel et al). These patents relate to voltage multiplier circuits employing capacitors and diodes, with the Petrick et al patent being concerned with a Cockcroft-Walton cascade circuit.

SUMMARY OF THE INVENTION

In accordance with the invention, an improved power supply for high voltage (25 watt) arc discharge lamps is provided which overcomes many of the disadvantages of the prior art. The power supply of the invention includes, inter alia, a solid state starter circuit which replaces the electromechanical components of the prior art. The invention eliminates problems associated with the prior art when used with aged lamps and, in this regard, provides reserve capacity to permit the use of such older lamps (which have higher starting voltage requirements), thus extending the useful life over which the lamps can be employed. The power supply of the invention also possesses an automatic restart capability so that if a lamp is extinguished due to a power interruption, the power supply circuit will automatically restart the lamp after power is restored. Further, the power supply of the invention does not require an operator to be in attendance.

In accordance with a preferred embodiment thereof, the present invention comprises, in combination, at least one high arc discharge lamp and a power supply circuit for the lamp, the power supply circuit comprising a relatively low voltage, high current power supply section and a high-voltage multiplier circuit connected between the low voltage section and the lamp. The low voltage power supply comprises a voltage transformer adapted to be connected to an A.C. source, a rectifier bridge circuit for rectifying the output of the voltage transformer, and a variable resistance device for limiting the current to the lamp, while the multiplier circuit comprises a plurality of diodes and capacitors connected in a series multiplier configuration for generating a high voltage, under no load conditions, so as to establish the lamp arc. The values of the capacitors employed are such that when the lamp arc is established, the diodes are biased into conduction and provide a very low resistance series current path through the multiplier circuit so that the multiplier circuit is bypassed and so that the supply voltage for the lamp is provided by the low voltage power supply section. The multiplier circuit acts, responsive to interruption of the lamp arc, to re-generating the high voltage so as to re-establish the arc.

The circuit configuration of the multiplier circuit is preferably that of a Cockcroft-Walton multiplier. Advantageously, the multiplier includes a first input provided by an isolating winding of the voltage transformer and a second input connected through a bank of parallel-connected capacitors to the variable resistance device of the low voltage supply section.

Other features and advantages of the invention will be set forth in, or apparent from, a detailed description of the preferred embodiment which follows.

DESCRIPTION OF THE PREFERRED EMBODIMENTS

Figure 1:
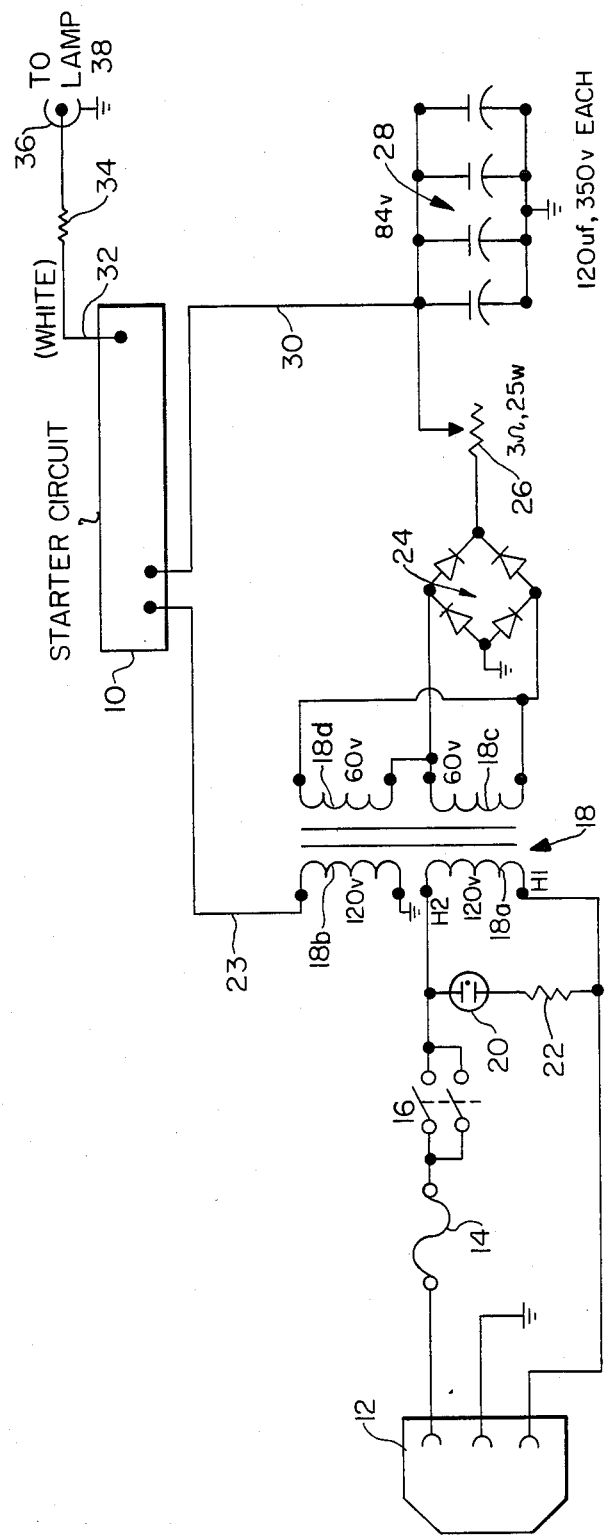
FIG. 1 is a schematic circuit diagram, partially in block form, of the power supply of the invention.

Referring to FIG. 1, a power supply for large arc discharge lamps is shown. The power supply includes a direct current supply section which, in the specific embodiment being considered, provides 84 volts D.C. and serves to provide power for the stabilized arc, and a starter circuit, which is indicated at 10 and is described in more detail below.

As illustrated, an electrical connector or plug 12 is connected through a fuse 14 (typically 1 ampere) and a switch 16 to a primary winding 18a of a step-down tranformer 18 which is shunted by a series combination of an indicator lamp 20 and a resistor 22 (typically 47K in a specific example). In a specific embodiment, the transformer 18 steps down the 120 volts appearing at the winding 18a to 60 volts and further includes a primary side isolating winding 18b is and a pair of secondary windings 18c and 18d connected as shown. The winding 18c is connected to a diode bridge 24 while the winding 18b is separately grounded and provides 120 volts A.C. via an AC line 23 to the AC input of a starter circuit 10.

The diode bridge 24 is connected through a variable resistor 26 to a capacitor filter 28 for filtering the D.C. output of the bridge 24. In the specific embodiment under consideration, the variable resistor 26 is a 3 ohm, 25 watt device while the parallel-connected capacitors of filter 28 are 120 microfarad, 350 volt capacitors. As noted above, this portion of the system, which constitutes the direct current supply, produces a D.C. voltage of 84 volts in the specific example under consideration, this voltage being supplied to a second input of the starter circuit 10 via a "common" line 30.

The output of the starter circuit 10 is connected via an output line 32 through a resistor 34 (25 ohms, 50 watts in a specific example) to an output terminal 36 adapted to be connected to the lamp. The resistor 34 and the variable resistor 26 limit the circuit current.

Figure 2:
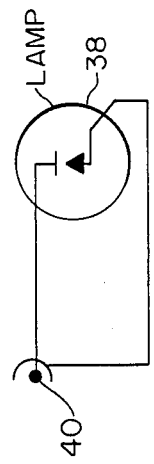
FIG. 2 is a schematic circuit diagram of a lamp to which the power supply is to be connected.

The lamp circuit is shown in FIG. 2 and includes a lamp 38 and an associated input terminal 40. As noted above and discussed in more detail below, a length of cable (not shown) is generally used in connecting the terminal 40 of the lamp 38 to the power supply shown in FIG. 1.

Figure 3:
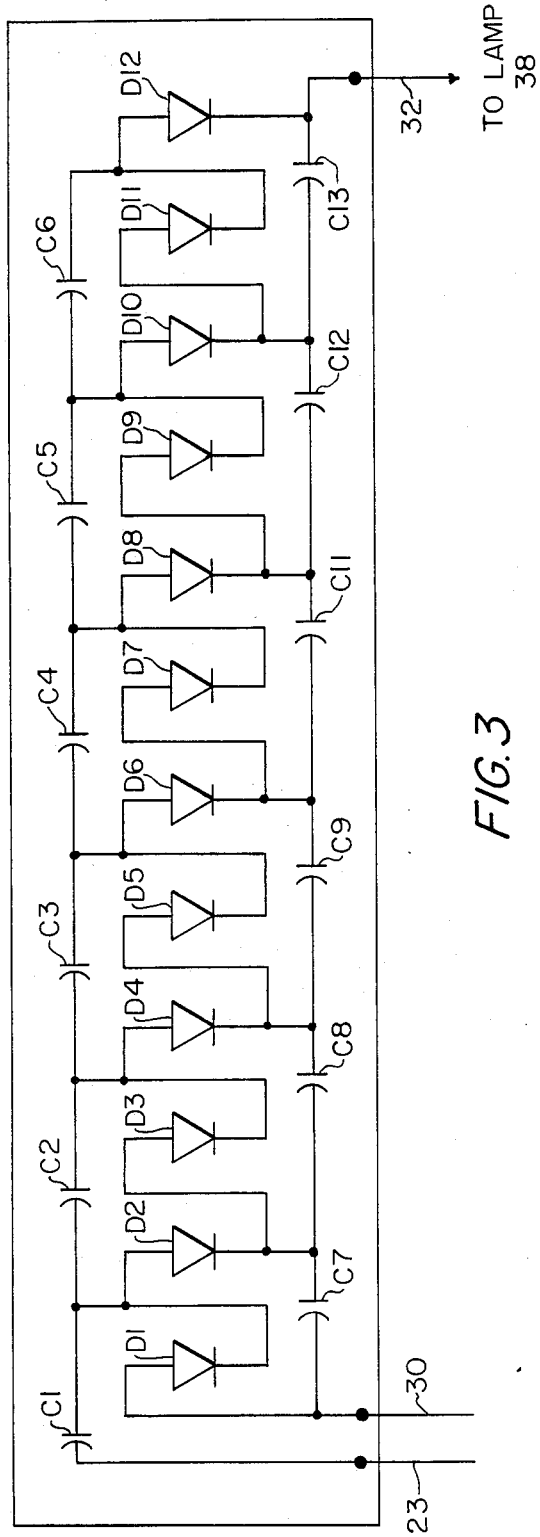
FIG. 3 is a detailed schematic circuit diagram of the starter circuit of in FIG. 1.

Referring to FIG. 3, a schematic circuit diagram of the starter circuit 10 is shown. As illustrated, this circuit comprises a Cockcroft-Walton multiplier and includes a plurality of diodes D1 to D12 connected cathode to anode, and two sets of capacitors comprising plurality of capacitors C1 to C6 and capacitors C7 to C12. As shown, the capacitors C1 to C12 are each connected between the junctions between the anodes and cathodes of two pairs of diodes. For example, the capacitor C2 is connected between the junction between the cathode of diode of D1 and the anode of diode D2 and the junction between the cathode of diode D3 and the anode of diode D4, while capacitor C8 is connected between the junction between the cathode of diode D2 and the anode of diode D3 and the junction between the cathode of diode D4 and the anode of diode D5. The values of the capacitors C1 to C13 are relatively small and in a specific embodiment, the capacitors are 0.01 microfarad, 500 volt capacitors, while the diodes D1 to D12 are INI204A devices (12 amperes, 400 volts).

In the specific example under consideration, under no load conditions, i.e., before the lamp arc is struck, the output of the starter-multiplier circuit 10 is 2,036 volts. After an arc is established, the resultant heavy current drain maintains a forward bias on all of the diodes D1 to D12 and the starter circuit is then constitutes a straight conductor current path providing a voltage drop of 7.2 volts.

The small values of the capacitors C1 to C12 used in the starter-multiplier circuit 10 guarantee that the diodes D1 to D12 will be forward biased when an arc is established. It is important to note that if the arc is interrupted due to a power failure or for some other reason, the multiplier 10 will again become functional, i.e., will again generate a high voltage for restarting the arc.

It is noted that adequate ventilation must be maintained for the output resistor 34 which typically dissipates 40 watts in the specific embodiment being considered. Further, the length of cable connection between the power supply and the lamp 38 should be kept relatively short so as to reduce distributed capacitance. In this regard, with a large cable capacitance, the non-linear arc produced can form a relaxation oscillator and operate in a self-pulsing mode. Cable lengths of four feet, using RG59 coaxial cables, present no problem.

Although the invention has been described relative to a presently preferred embodiment thereof, it will be understood by those skilled in the art that variations and modifications can be effected in this preferred embodiment without departing from the scope and spirit of the invention.

What is claimed:

1. An apparatus comprising at least one high voltage arc discharge lamp and a power supply circuit for the lamp, said power supply circuit comprising a relatively low voltage, high current power supply section and a high-voltage multiplier circuit connected between said low voltage section and said at least one lamp, said low voltage power supply comprising a voltage transformer adapted to be connected to an A.C. source, a rectifier bridge circuit for rectifying the output of the voltage transformer, and a variable resistance device for limiting the current to the lamp, and said multiplier circuit comprising a plurality of diodes and capacitors connected in a series multiplier configuration for momentarily generating a high voltage, under no load conditions, sufficient to establish the lamp arc, and the values of said capacitors being such that when the lamp arc is established, the diodes are biased into conduction to provide a low resistance series current path through the multiplier circuit to provide a continuous low supply voltage for the lamp from said low voltage power supply section, said multiplier circuit constituting means for automatically re-generating said high voltage momentarily so as to reestablish the arc after an interruption and restoration of power from said A.C. source.

2. An apparatus as claimed in claim 1 wherein the circuit configuration of said multiplier circuit is that of a Cockcroft-Walton multiplier.

3. An apparatus as claimed in claim 1 wherein said at least one arc discharge lamp comprises a 25 watt lamp and a cable connection is provided between the lamp and the output of the multiplier circuit.

4. An apparatus as claimed in claim 1 including a winding in said voltage transformer isolated from the A.C. source and connected to one input of said multiplier circuit.

5. An apparatus as claimed in claim 1 wherein a bank of parallel connected capacitors is connected between said variable resistance device and one input of said multiplier circuit.

* * * * *